US012780326B2

(12) United States Patent
Seon

(10) Patent No.: US 12,780,326 B2
(45) Date of Patent: Nov. 3, 2026

(54) MUDGUARD STRUCTURE FOR A VEHICLE

(71) Applicants: HYUNDAI MOTOR COMPANY, Seoul (KR); KIA CORPORATION, Seoul (KR)

(72) Inventor: Dong Ku Seon, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 318 days.

(21) Appl. No.: 18/615,725

(22) Filed: Mar. 25, 2024

(65) Prior Publication Data

US 2025/0100626 A1 Mar. 27, 2025

(30) Foreign Application Priority Data

Sep. 25, 2023 (KR) ........................ 10-2023-0128423

(51) Int. Cl.
*B62D 25/16* (2006.01)
*B62D 25/18* (2006.01)

(52) U.S. Cl.
CPC ......... *B62D 25/168* (2013.01); *B62D 25/188* (2013.01)

(58) Field of Classification Search
CPC .... B62D 25/168; B62D 25/188; B62D 25/16; B62D 25/163; B62D 25/18; B62D 25/182; B62D 25/186; B60Q 1/30; B60Q 1/0005; B60Q 1/26; B60Q 1/301; B60Q 1/3015; B60Q 1/00
See application file for complete search history.

(56) References Cited

U.S. PATENT DOCUMENTS 1,480,783 A * 1/1924 Sawyer .................... B60Q 1/26 116/45
2,106,992 A * 2/1938 Bahr ...................... B62D 25/18 280/418.1
3,941,994 A * 3/1976 Petty .......................... B62J 6/04 D12/186
4,268,053 A * 5/1981 Toppins ............... B62D 25/168 280/154
4,413,839 A * 11/1983 McCain ............... B62D 25/168 280/851
4,422,664 A * 12/1983 Poveromo ................. B60P 3/10 280/414.1
4,442,477 A * 4/1984 Hennessey ............... B60Q 1/18 362/52
4,690,419 A * 9/1987 Hoshal ................. B62D 25/188 280/851
4,960,294 A * 10/1990 Leonard ............... B62D 25/188 280/848
5,025,351 A * 6/1991 Martin ................. B60Q 1/2661 40/550
5,833,283 A * 11/1998 Shaw ...................... B60R 19/50 293/121
6,164,804 A * 12/2000 Self ...................... B60Q 1/3015 362/543
7,182,375 B1 * 2/2007 Shoen .................. B62D 25/168 280/847

(Continued)

*Primary Examiner* — James M Dolak
(74) *Attorney, Agent, or Firm* — Lempia Summerfield Katz LLC

(57) ABSTRACT

A mudguard structure for a vehicle includes a mounting stay hanger mounted on a chassis frame of the vehicle, a mudguard mounted on the mounting stay hanger, and a lamp mounted on the mounting stay hanger adjacent to the mudguard.

15 Claims, 14 Drawing Sheets

(56) References Cited

U.S. PATENT DOCUMENTS

| | | | | |
|---|---|---|---|---|
| 7,815,156 | B2 * | 10/2010 | Yang | B62J 11/00 248/220.21 |
| 9,016,912 | B1 * | 4/2015 | Gustafson | B60Q 1/0088 362/500 |
| 9,221,390 | B1 * | 12/2015 | Begley | B62D 35/001 |
| 9,260,151 | B2 * | 2/2016 | Tako | B62J 6/055 |
| 10,370,038 | B2 * | 8/2019 | Fujimoto | B62D 25/168 |
| 10,507,872 | B2 * | 12/2019 | Maier | B62D 25/182 |
| 10,730,565 | B2 * | 8/2020 | Maier | B62D 25/186 |
| 10,933,921 | B1 * | 3/2021 | Jacobson | B60Q 1/2661 |
| 11,247,604 | B1 * | 2/2022 | Kim | B62D 25/182 |
| 11,260,920 | B2 * | 3/2022 | Bender | B62D 25/188 |
| 12,172,701 | B2 * | 12/2024 | Serizawa | B62D 25/163 |
| 2008/0310179 | A1 * | 12/2008 | Bates | B62D 25/188 362/549 |
| 2013/0221650 | A1 * | 8/2013 | Wiltshire | B62D 25/182 280/847 |

* cited by examiner

MUDGUARD STRUCTURE FOR A VEHICLE

CROSS-REFERENCE TO RELATED APPLICATION

This application is based on and claims the benefit of priority to Korean Patent Application No. 10-2023-0128423, filed on Sep. 25, 2023, in the Korean Intellectual Property Office, the disclosure of which is incorporated herein in its entirety by reference.

TECHNICAL FIELD

The present disclosure relates to a mudguard structure for a vehicle, and more particularly, to a mudguard structure for a vehicle designed to mount a lamp and a mudguard together on a chassis frame through a mounting stay hanger.

BACKGROUND

A vehicle includes a mudguard and a lamp. The mudguard may be designed to prevent mud and water thrown into the air by a rotating tire from hitting the vehicle. The lamp may be disposed adjacent to the mudguard.

A dump truck may include a dump body pivotally connected to a chassis frame. A rear end of the dump body may be pivotally connected to a rear end of the chassis frame through a pivot pin. Materials such as aggregate, gravel, and sand may be contained in the dump body. A gate may be mounted to open and close on the rear end of the dump body. As the dump body pivots around the pivot pin by a dumping actuator such as a hydraulic cylinder, it may move between a travel or driving position and a dumping position. After the dump truck arrives at a destination, the gate may be opened when the dump body is moved to the dumping position by the dumping actuator, and then the materials in the dump body may fall onto the ground behind the dump truck.

Existing dump trucks have rear lamps and rear mudguards mounted on the rear end of the dump body. By repeated dumping to unload the materials attached to the rear of the dump body, the gate may repeatedly collide with the rear end of the dump body. An impact force generated by the gate repeatedly colliding with the rear end of the dump body may be transmitted to the rear lamps, and thus damage to the rear lamps may occur frequently.

The above information described in the Background section is provided to assist in understanding the background of the inventive concept. The Background section may include technical concepts which are not considered as prior art that is already known to those having ordinary skill in the art.

SUMMARY

The present disclosure has been made to solve the above-mentioned problems occurring in the prior art while advantages achieved by the prior art are maintained intact.

An aspect of the present disclosure provides a mudguard structure for a vehicle designed to mount a lamp and a mudguard together on a chassis frame through a mounting stay hanger. As a result, the mudguard structure simplifies the assembly of the lamp and the mudguard, reduces the weight of the vehicle, and prevents damage to the lamp caused by an impact force.

According to an aspect of the present disclosure, a mudguard structure for a vehicle may include: a mounting stay hanger mounted on a chassis frame of the vehicle; a mudguard mounted on the mounting stay hanger; and a lamp mounted on the mounting stay hanger adjacent to the mudguard.

The mounting stay hanger may include a hanger body extending from the chassis frame in a cantilever manner and a mounting frame fixed to the hanger body.

A first end portion of the hanger body may be fixed to the chassis frame through a mounting bracket. The mounting bracket may include a first wall fixed to the chassis frame, a second wall connected perpendicular to the first wall, and a curved wall connected to the second wall. The curved wall may be curved to match a top surface of the first end portion of the hanger body. The first end portion of the hanger body may be fixed to the curved wall and the first wall.

The mounting stay hanger may further include a lower reinforcing member supporting a bottom surface of a first end portion of the hanger body.

The mounting stay hanger may further include a reinforcing plate fixed to the hanger body and the mounting frame.

The reinforcing plate may extend in a longitudinal axis of the hanger body. A first end portion of the reinforcing plate may be fixed to the lower reinforcing member. A second end portion of the reinforcing plate may be fixed to the mounting frame.

The mounting frame may further include a first mounting member fixed to a middle portion of the hanger body, a second mounting member fixed to a second end portion of the hanger body, and a third mounting member located between the first mounting member and the second mounting member. The mounting frame may also include a lower member connecting a bottom end of the first mounting member, a bottom end of the second mounting member, and a bottom end of the third mounting member.

The mudguard may be fixed to the first mounting member and the second mounting member through a plurality of fasteners.

The mudguard may include a first upper mounting portion and a first lower mounting portion connected to the first upper mounting portion through a first extension rib. The mudguard may also include a second upper mounting portion spaced apart from the first upper mounting portion in a width direction of the mudguard and a second lower mounting portion connected to the second upper mounting portion through a second extension rib. The first upper mounting portion and the first lower mounting portion may be fixed to the first mounting member through a plurality of fasteners. The second upper mounting portion and the second lower mounting portion may be fixed to the second mounting member through a plurality of fasteners.

The first upper mounting portion, the first extension rib, and the first lower mounting portion may be raised from the mudguard. The second upper mounting portion, the second extension rib, and the second lower mounting portion may be raised from the mudguard.

The mudguard may further include a mudflap fixed to a bottom end thereof.

The lamp may be fixed to the third mounting member and the lower member through a plurality of fasteners.

The mudguard structure may further include a cover that covers an upper portion and opposing side surfaces of the lamp. The cover may include a top wall and a pair of sidewalls. Each sidewall may be provided at a respective side edge of the top wall.

The mudguard may further include an inclined portion provided on an upper portion thereof. The inclined portion may be inclined at an angle that is the same as that of the top wall of the cover. The inclined portion may be aligned with the top wall of the cover.

The mudguard structure may further include a protector protecting an irradiation surface of the lamp. The protector may be mounted on the cover through a plurality of fasteners.

The protector may include a pair of sidewalls and a plurality of horizontal bars extending transverse to the pair of sidewalls. Each sidewall of the protector may be fixed to a corresponding sidewall of the cover through the plurality of fasteners.

The mudguard may further include a discharge channel located above the lamp.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
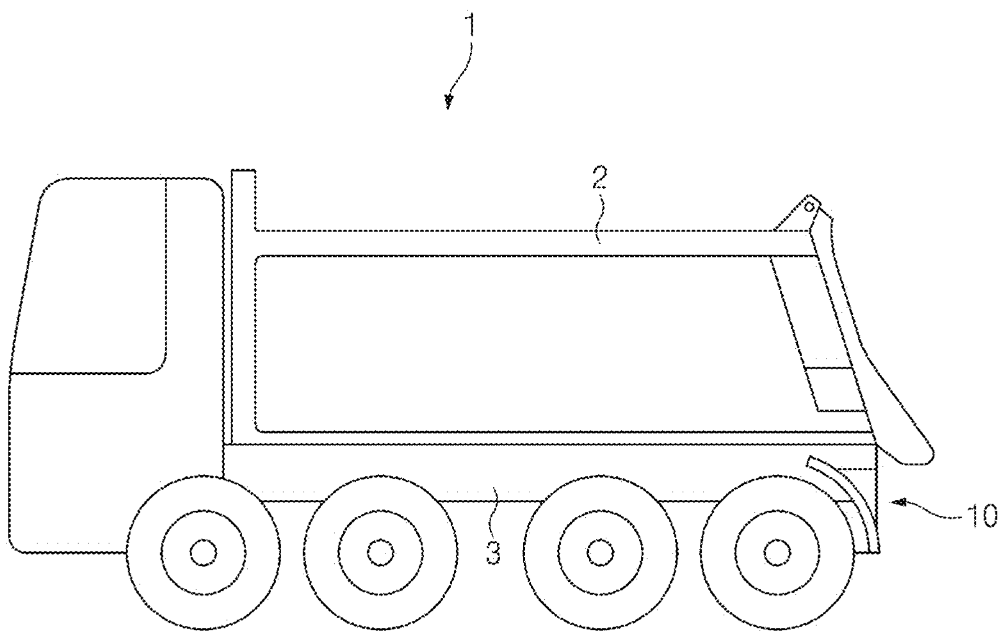
FIG. 1 illustrates a side view of vehicle and a mudguard structure according to an embodiment of the present disclosure mounted on a chassis frame of the vehicle.

Hereinafter, embodiments of the present disclosure are described in detail with reference to the accompanying drawings. In the drawings, the same reference numerals are used throughout to designate the same or equivalent elements. In addition, a detailed description of well-known techniques associated with the present disclosure has been omitted in order not to unnecessarily obscure the gist of the present disclosure.

Terms such as first, second, A, B, (a), and (b) may be used to describe the elements in embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings consistent with the contextual meanings in the relevant field of art. Such terms are not to be interpreted as having ideal or excessively formal meanings unless clearly defined as having such in the present application.

When a component, device, element, part, unit, module, or the like of the present disclosure is described as having a purpose or performing an operation, function, or the like, the component, device, element, part, unit, or module should be considered herein as being "configured to" meet that purpose or perform that operation or function.

Referring to FIG. 1, a mudguard structure 10 according to an embodiment of the present disclosure may be mounted on a chassis frame 3 of a vehicle 1. The mudguard structure 10 may be disposed adjacent to a rear wheel of the vehicle 1. According to an embodiment, the vehicle 1 may be a dump truck 1, and the dump truck 1 may include a dump body 2. A rear end of the dump body 2 may be pivotally connected to a rear end of the chassis frame 3 through a pivot pin. As the dump body 2 is pivoted around the pivot pin by a dumping actuator such as a hydraulic cylinder, the dump body may move between a travel or driving position, i.e., a lowered position as shown, and a dumping or raised position. The travel position refers to a position in which the dump body 2 is parallel to the chassis frame 3 and the dumping position refers to a position in which the dump body 2 is inclined with respect to the chassis frame 3. When the dump body 2 is in the travel position, materials such as aggregate, gravel, and sand may be contained in the dump body 2, and a gate (not shown) may be closed on the rear end of the dump body 2. After the dump truck 1 arrives at a destination, the dump body 2 may be moved to the dumping position by the dumping actuator, and the gate may be opened. As the gate is opened, the materials in the dump body 2 may fall out of the dump body 2 and onto the ground behind the dump truck 1.

Figure 2:
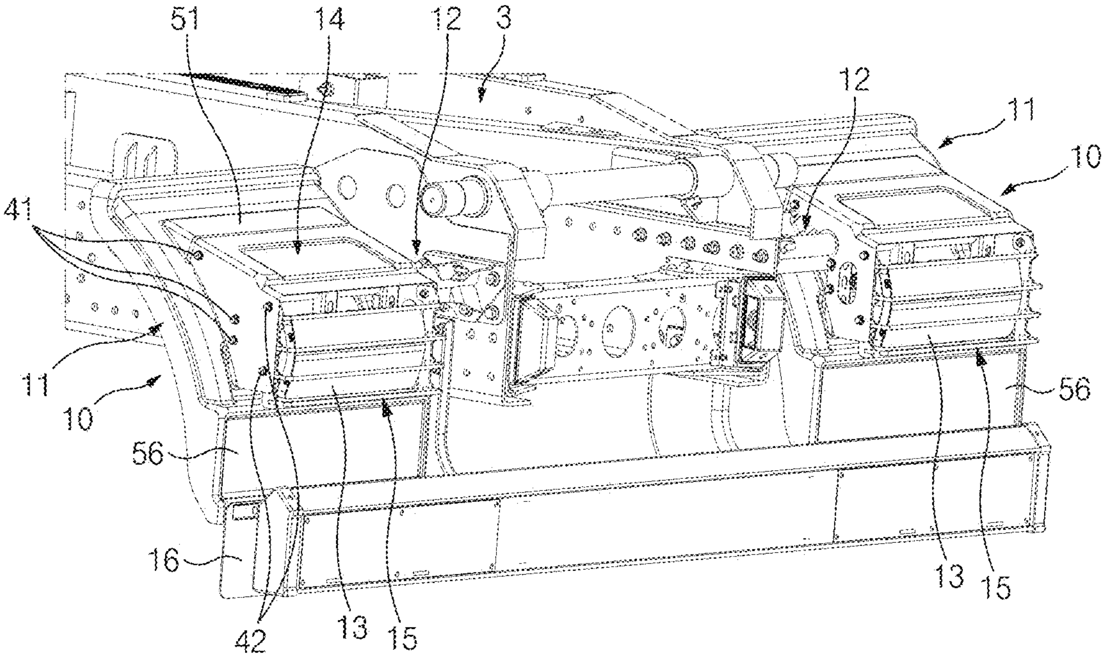
FIG. 2 illustrates a perspective view of a state in which a pair of mudguard structures according to an embodiment of the present disclosure is mounted on opposing sides of a rear end of a chassis frame.
Figure 3:
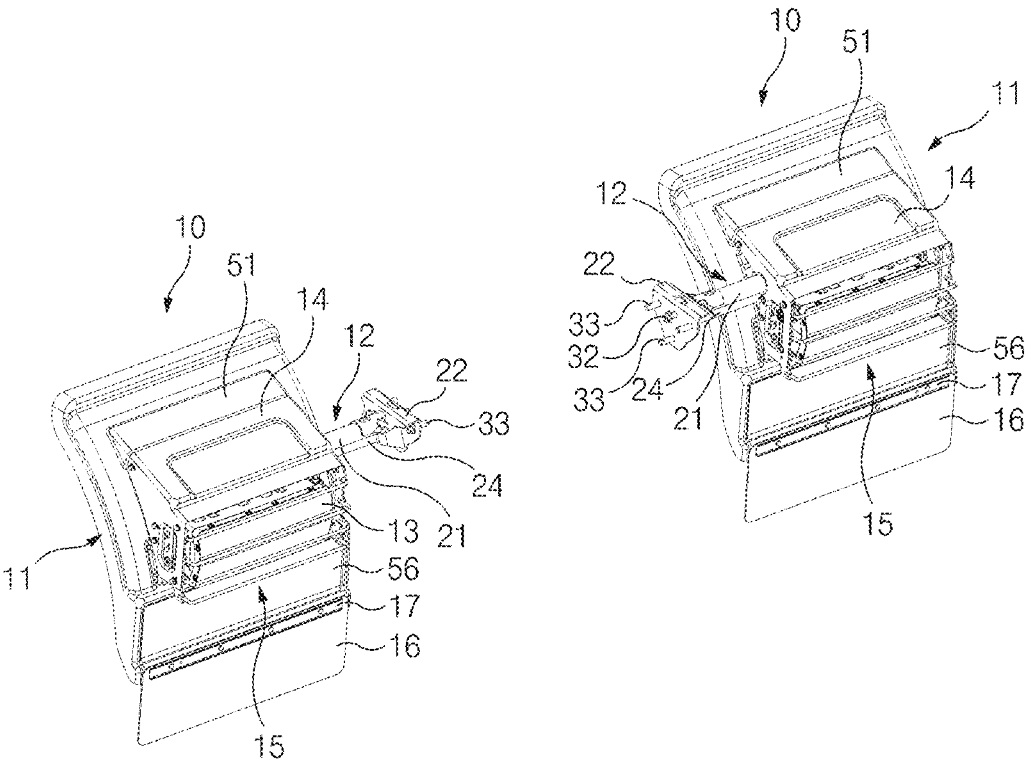
FIG. 3 illustrates a perspective view of a pair of mudguard structures according to an embodiment of the present disclosure.

Referring to FIG. 2, a pair of mudguard structures 10 may be mounted on opposing sides of the rear end of the chassis frame 3, respectively. Each mudguard structure 10 may include a mounting stay hanger 12 mounted on the rear end of the chassis frame 3, a mudguard 11 mounted on the mounting stay hanger 12, and a lamp 13 mounted on the mounting stay hanger 12 adjacent to the mudguard 11. According to an embodiment, the mudguard structure 10 may be a rear mudguard structure mounted on the rear end of the chassis frame 3 of the vehicle 1, the mudguard 11 may be a rear mudguard, and the lamp 13 may be a rear lamp.

Figure 4:
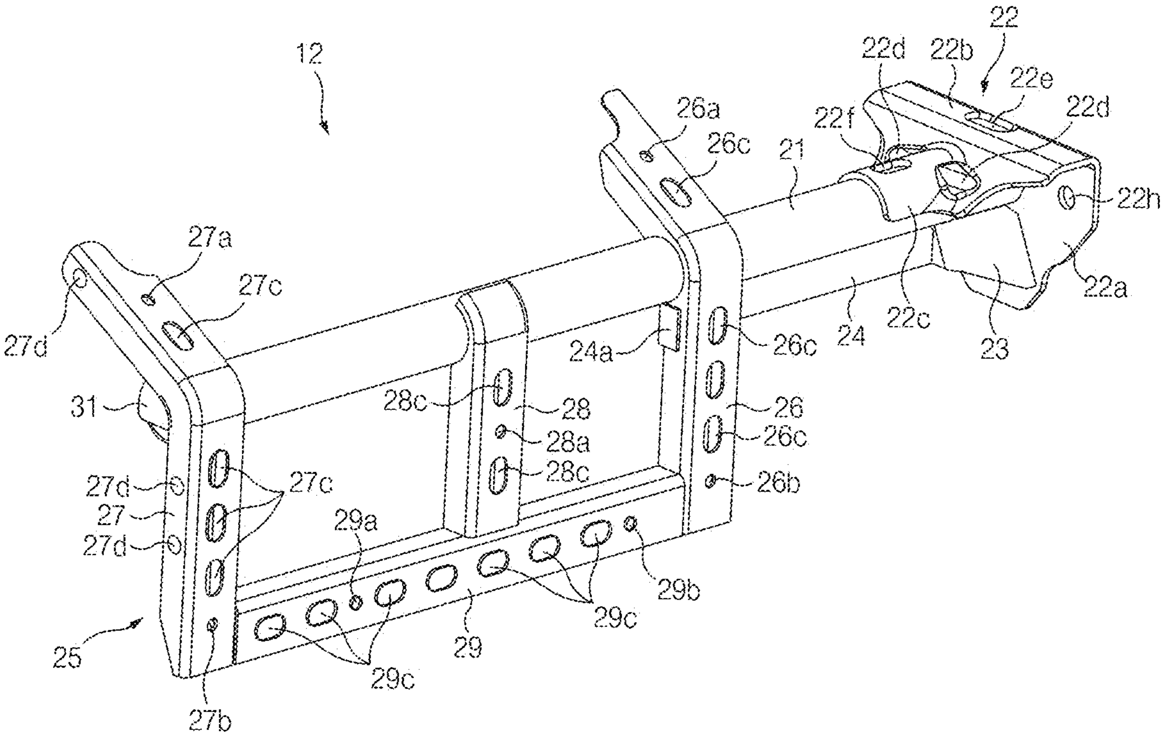
FIG. 4 illustrates a perspective view of a mounting stay hanger of each mudguard structure according to an embodiment of the present disclosure.
Figure 5:
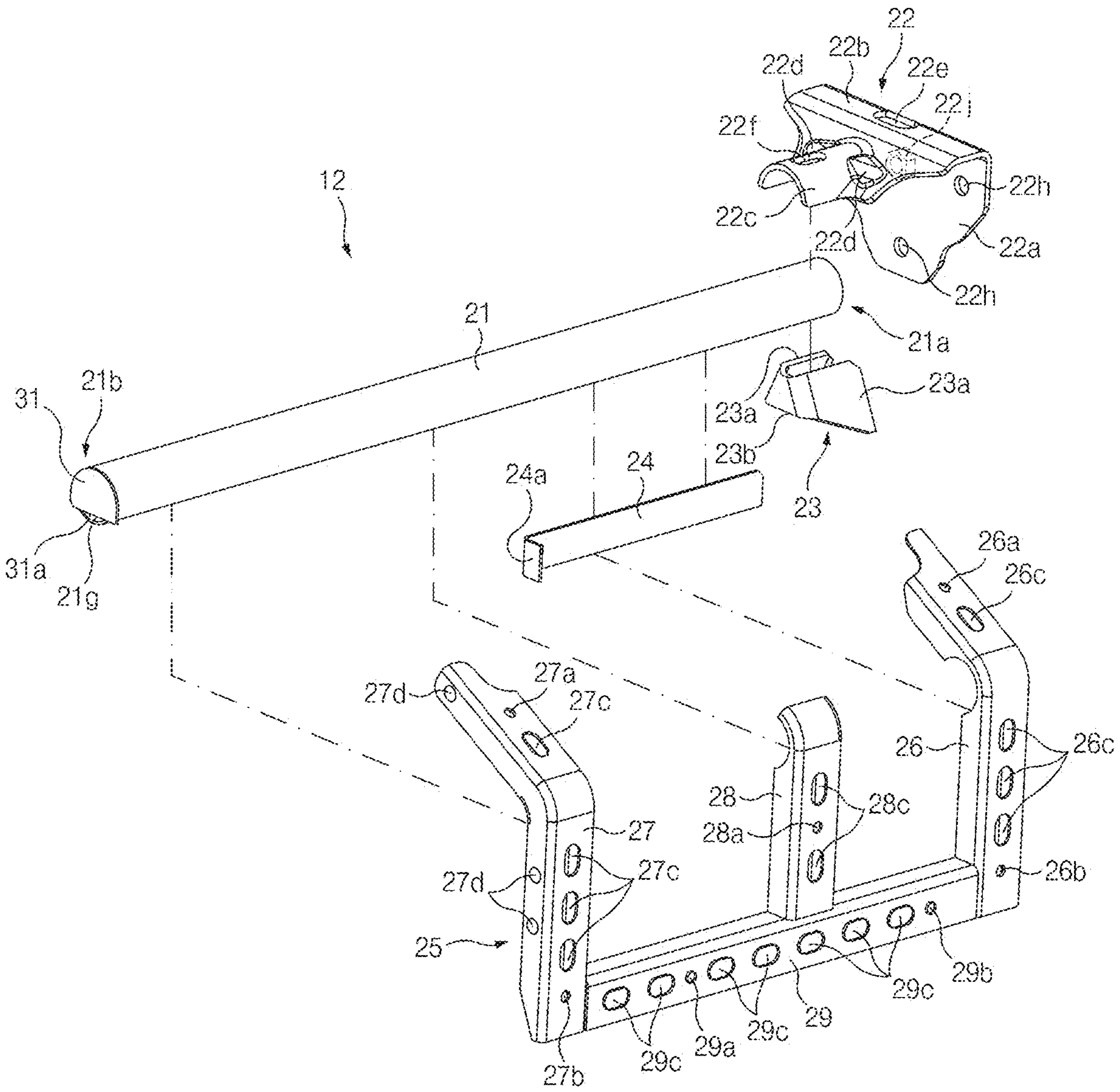
FIG. 5 illustrates an exploded perspective view of a mounting stay hanger of each mudguard structure according to an embodiment of the present disclosure.

Referring to FIGS. 4 and 5, the mounting stay hanger 12 may include a hanger body 21 extending from the chassis frame 3 in a width direction of the vehicle and may include a mounting frame 25 fixed to the hanger body 21.

Referring to FIG. 5, the hanger body 21 may be a hollow pipe with both ends open. The hanger body 21 may have a first end portion 21*a* and a second end portion 21*b*.

The mounting stay hanger 12 may include a mounting bracket 22 fixed to the first end portion 21*a* of the hanger body 21 and may include an end plate 31 covering at least a portion of the open second end portion 21*b* of the hanger body 21.

The first end portion 21*a* of the hanger body 21 may be mounted on the chassis frame 3 through the mounting bracket 22 so that the hanger body 21 may extend from the chassis frame 3 in a cantilever manner. The first end portion 21*a* of the hanger body 21 may be a fixed end, which is fixed to the chassis frame 3 through the mounting bracket 22. The second end portion 21*b* of the hanger body 21 may be a free end.

The mounting bracket 22 may include a first wall 22*a*, a second wall 22*b* connected perpendicular to the first wall 22*a*, and a curved wall 22*c* connected to the second wall 22*b*. The mounting bracket 22 may be fixed to the first end portion 21*a* of the hanger body 21 by welding. The mounting bracket 22 may be mounted on one sidewall of the chassis frame 3 through a plurality of fasteners 32 and 33.

Figure 6:
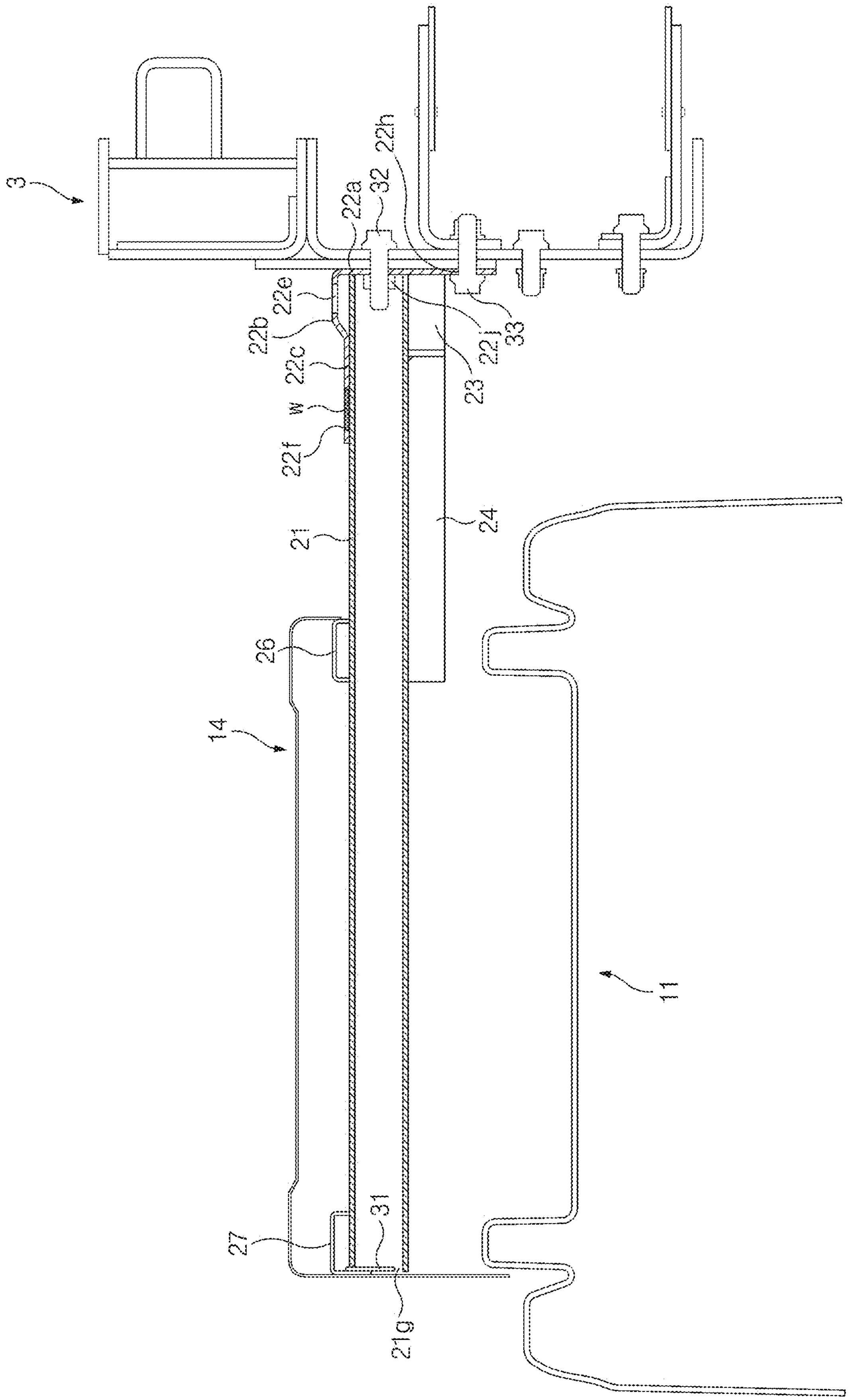
FIG. 6 illustrates a cross-sectional view of a state in which each mudguard structure according to an embodiment of the present disclosure is mounted on a chassis frame.

The first wall 22*a* may have a plurality of mounting holes 22*h* for receiving fasteners. The first wall 22*a* may be fixed to the chassis frame 3 through a plurality of fasteners (e.g., bolts) 32 and 33, as shown in FIG. 6. An end surface of the first end portion 21*a* of the hanger body 21 may be fixed to the first wall 22*a* by welding all around. Accordingly, the hanger body 21 may be fixed to be perpendicular to the first wall 22*a*. Referring to FIG. 6, a welded nut 22*j* may be fixed to the first wall 22*a*. The welded nut 22*j* may be located within the first end portion 21*a* of the hanger body 21. A bolt 32 may be inserted into a mounting hole of the chassis frame 3 and a mounting hole of the first wall 22*a*. The bolt 32 may be screwed into the welded nut 22*j* of the mounting bracket 22 so that the bolt 32 may be inserted in a direction from the chassis frame 3 toward the mounting bracket 22. A plurality of bolts 33 may be screwed into welded nuts 22*j* of the chassis frame 3 through the plurality of mounting holes 22*h*, respectively.

The second wall 22*b* may have an opening 22*e* through which a welding gun (not illustrated) passes. The welding gun may pass through the opening 22*e* to thereby weld the end surface of the first end portion 21*a* of the hanger body 21 and the first wall 22*a*. Accordingly, the end surface of the first end portion 21*a* of the hanger body 21 may be fixed to the first wall 22*a* by welding all around.

The curved wall 22*c* may be curved to match a shape of a top surface of the first end portion 21*a* of the hanger body 21. Accordingly, the curved wall 22*c* may be tightly attached to the top surface of the first end portion 21*a* of the hanger body 21. The curved wall 22*c* may be integrally connected to the second wall 22*b*. A pair of reinforcing beads 22*d* may be provided between both sides of the curved wall 22*c* and the second wall 22*b*. Accordingly, the reinforcing beads 22*d* may improve the stiffness of the mounting bracket 22.

Referring to FIGS. 4 and 5, the curved wall 22*c* may have a slot 22*f* extending to a predetermined length. Referring to FIG. 6, by making a weld w inside the slot 22*f*, the curved wall 22*c* may be fixed to the top surface of the first end portion 21*a* of the hanger body 21 by plug welding.

As described above, the second wall 22*b* and the curved wall 22*c* may be perpendicular to the first wall 22*a*. The first end portion 21*a* of the hanger body 21 may be firmly fixed to the first wall 22*a* and the curved wall 22*c*. Additionally, the first wall 22*a* may be firmly fixed to the sidewall of the chassis frame 3 so that the mounting bracket 22 may be firmly fixed to the sidewall of the chassis frame 3. As a result, all stresses acting on the mounting stay hanger 12 may be uniformly distributed by the mounting bracket 22.

Referring to FIG. 5, the end plate 31 may be fixed to the second end portion 21*b* of the hanger body 21 so as to cover at least a portion of the open second end portion 21*b* of the hanger body 21. The end plate 31 may have a cut surface 31*a* formed at a bottom end thereof. The cut surface 31*a* of the end plate 31 may be located higher than a bottom end of an end surface of the second end portion 21*b* of the hanger body 21 so that an opening 21*g* may be formed between the second end portion 21*b* of the hanger body 21 and the end plate 31. When the hanger body 21 is coated with an electrodeposition coating solution, the electrodeposition coating solution may be discharged through the opening 21*g*. In addition, the end plate 31 may be fixed to a curved portion of a second mounting member 27 by welding.

The mounting stay hanger 12 may further include a lower reinforcing member 23 supporting a bottom surface of the first end portion 21*a* of the hanger body 21. The lower reinforcing member 23 may have a U-like shape including a pair of support walls 23*a* and a connection wall 23*b* connecting the pair of support walls 23*a*. The lower reinforcing member 23 may be joined to the bottom surface of the first end portion 21*a* of the hanger body 21 by welding. The mounting bracket 22 and the lower reinforcing member 23 may face each other above and below the first end portion 21*a* of the hanger body 21 so that the second moment of area (e.g., area moment of inertia) of the hanger body 21 may be increased at the first end portion 21*a* of the hanger body 21. Thus, the stiffness of the hanger body 21 may be improved and sagging of the hanger body 21 may be prevented. The lower reinforcing member 23 may firmly support the bottom surface of the first end portion 21*a* of the hanger body 21. Additionally, when a bending load acts on the mounting stay hanger 12, the lower reinforcing member 23 may absorb the bending load. As a result, the connection stiffness between the mounting stay hanger 12 and the chassis frame 3 may be improved.

The mounting frame 25 may be spaced apart from the mounting bracket 22. The mounting frame 25 may include a first mounting member 26 fixed to a middle portion of the hanger body 21, and the second mounting member 27 fixed to the second end portion 21*b* of the hanger body 21. The mounting frame 25 may also include a third mounting member 28 located between the first mounting member 26 and the second mounting member 27. Additionally, the mounting frame 25 may include a lower member 29 horizontally connecting a bottom end of the first mounting member 26, a bottom end of the second mounting member 27, and a bottom end of the third mounting member 28. Accordingly, the mounting frame 25 may form a grid-type frame.

The first mounting member 26 may have a vertical portion, an inclined portion extending obliquely from the vertical portion, and a curved portion formed between the vertical portion and the inclined portion. The curved portion of the first mounting member 26 may be fixed to the middle portion of the hanger body 21 between the first end portion 21*a* and the second end portion 21*b* by welding. The first mounting member 26 may have an upper mounting hole 26*a* provided in an upper portion thereof and a lower mounting hole 26*b* provided in a lower portion thereof. The upper mounting hole 26*a* may be formed in the inclined portion and the lower mounting hole 26*b* may be formed in a lower portion of the vertical portion. The first mounting member 26 may have a plurality of slots 26*c*. Accordingly, the weight of the first mounting member 26 may be reduced due to the plurality of slots 26*c*.

The second mounting member 27 may have a vertical portion, an inclined portion extending obliquely from the vertical portion, and a curved portion formed between the vertical portion and the inclined portion. The curved portion of the second mounting member 27 may be fixed to the second end portion 21*b* of the hanger body 21 by welding. The second mounting member 27 may have an upper mounting hole 27*a* provided in an upper portion thereof and a lower mounting hole 27*b* provided in a lower portion thereof. The upper mounting hole 27*a* may be formed in the inclined portion and the lower mounting hole 27*b* may be formed in a lower portion of the vertical portion. The second mounting member 27 may have a plurality of slots 27*c*. Accordingly, the weight of the second mounting member 27 may be reduced due to the plurality of slots 27*c*.

The third mounting member 28 may be located between the first mounting member 26 and the second mounting member 27. A top end of the third mounting member 28 may be fixed to the hanger body 21 by welding. The third mounting member 28 may have a mounting hole 28*a* located in a middle portion thereof. The third mounting member 28 may have a plurality of slots 28*c*. Accordingly, the weight of the third mounting member 28 may be reduced due to the plurality of slots 28*c*.

The lower member 29 may connect the bottom end of the first mounting member 26, the bottom end of the third mounting member 28, and the bottom end of the second mounting member 27. The lower member 29 may have a plurality of mounting holes 29*a* and 29*b*. The lower member 29 may also have a plurality of slots 29*c*. Accordingly, the weight of the lower member 29 may be reduced due to the plurality of slots 29*c*.

Referring to FIGS. 4 and 5, the mounting stay hanger 12 may further include a reinforcing plate 24 fixed to the hanger body 21 and the mounting frame 25. The reinforcing plate 24 may extend in a longitudinal axis of the hanger body 21. A top edge of the reinforcing plate 24 may be fixed to a bottom surface of the hanger body 21 by welding. A first end portion of the reinforcing plate 24 may be fixed to the lower reinforcing member 23 by welding. A second end portion of the reinforcing plate 24 may be fixed to the first mounting member 26 of the mounting frame 25 by welding. The reinforcing plate 24 may have a bent portion 24*a* provided at the second end portion thereof. The bent portion 24*a* of the reinforcing plate 24 may be fixed to the first mounting member 26 by welding. Accordingly, the reinforcing plate 24 may be fixed to the bottom surface of the hanger body 21 between the mounting frame 25 and the lower reinforcing member 23 so that the reinforcing plate 24 may improve the second moment of area of the hanger body 21 and the stiffness of the hanger body 21. Additionally, as a result of the configuration, the reinforcing member may prevent the hanger body 21 from sagging.

Figure 9:
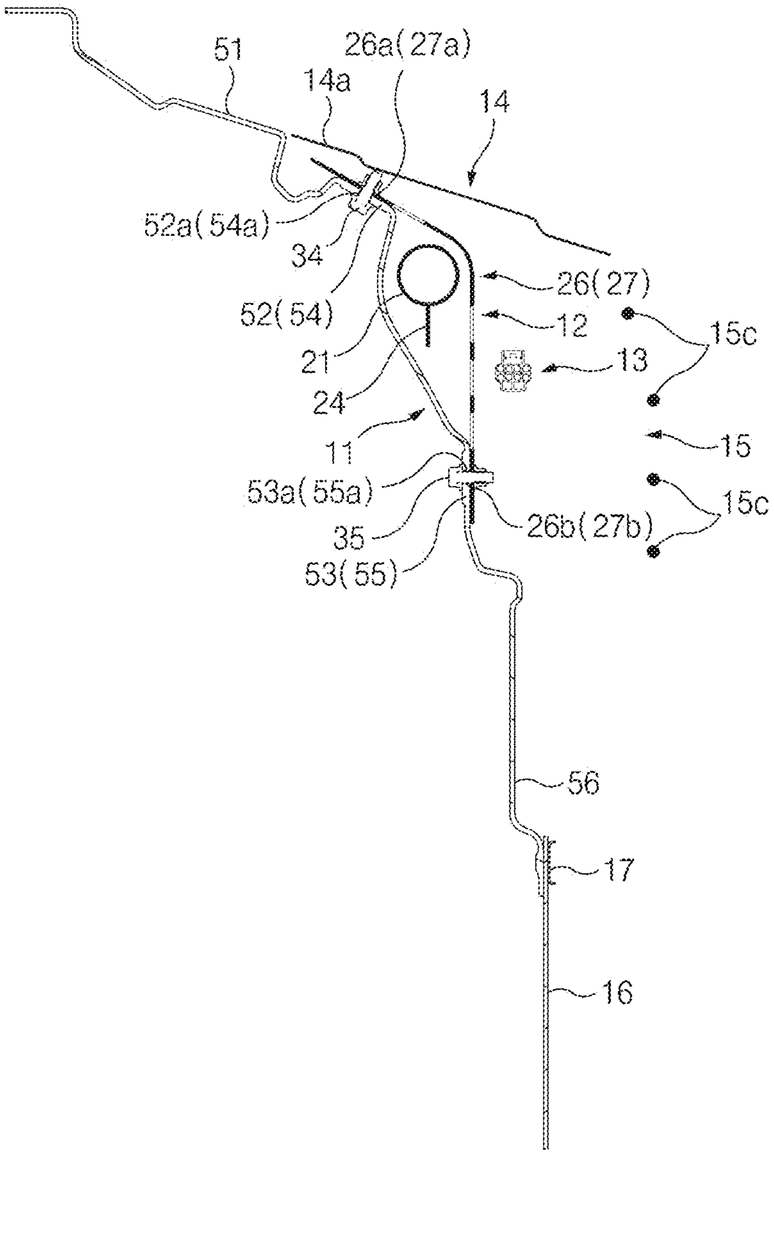
FIG. 9 illustrates a cross-sectional view of the mudguard structure, taken along line B-B of FIG. 7.

The mudguard 11 may be mounted on the rear end of the chassis frame 3 through the mounting stay hanger 12. The mudguard 11 may have a first edge adjacent to the chassis frame 3 and a second edge opposing the first edge. Referring to FIG. 9, the mudguard 11 may be fixed to the first mounting member 26 and the second mounting member 27 of the mounting frame 25 of the mounting stay hanger 12 through fasteners 34 and 35.

Figure 12:
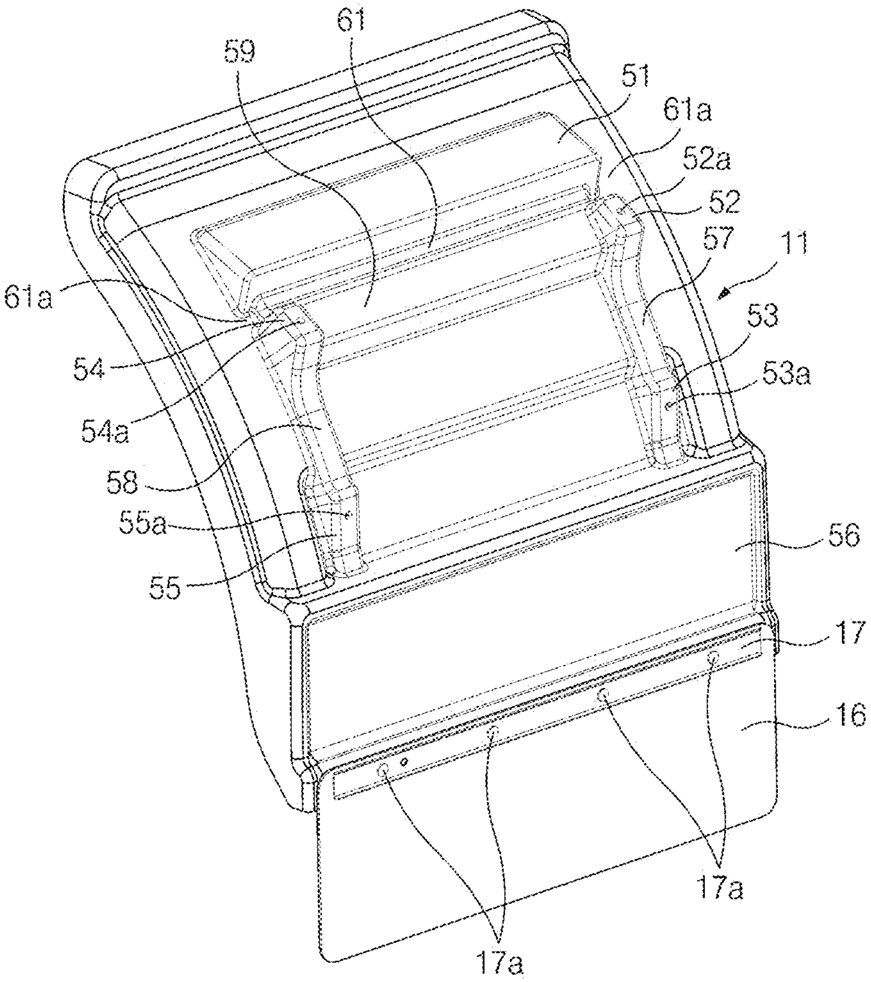
FIG. 12 illustrates a perspective view of a mudguard for each mudguard structure according to an embodiment of the present disclosure.

Referring to FIG. 12, the mudguard 11 may be curved to match a shape of the wheel of the vehicle. Additionally, the mudguard 11 may have a predetermined width corresponding to that of the width of the wheel. The mudguard 11 may include a first upper mounting portion 52 and a first lower mounting portion 53 located below the first upper mounting portion 52. The mudguard 11 may also include a second upper mounting portion 54 spaced apart from the first upper mounting portion 52 and a second lower mounting portion 55 located below the second upper mounting portion 54. The second lower mounting portion 55 may also be spaced apart from the first lower mounting portion 53.

The first upper mounting portion 52 may be raised from a portion of the mudguard 11 adjacent to a first edge of the mudguard 11 toward the rear of the vehicle 1. The first upper mounting portion 52 may have a mounting hole 52*a* in which a fastener is received.

The first lower mounting portion 53 may be raised from a portion of the mudguard 11 adjacent to the first edge of the mudguard 11 toward the rear of the vehicle 1. The first lower mounting portion 53 may have a mounting hole 53*a* in which a fastener is received.

The first lower mounting portion 53 may be connected to the first upper mounting portion 52 through a first extension rib 57. The first extension rib 57 may be raised toward the rear of the vehicle 1. The first upper mounting portion 52, the first extension rib 57, and the first lower mounting portion 53 may be connected along a curved portion of the mudguard 11. Accordingly, the stiffness of the curved portion of the mudguard 11 may be improved.

The second upper mounting portion 54 may be spaced apart from the first upper mounting portion 52 in a width direction of the mudguard 11. The second upper mounting portion 54 may be raised from a portion of the mudguard 11 adjacent to a second edge of the mudguard 11 toward the rear of the vehicle 1. Additionally, the second upper mounting portion 54 may have a mounting hole 54*a* in which a fastener is received.

The second lower mounting portion 55 may be spaced apart from the first lower mounting portion 53 in the width direction of the mudguard 11. The second lower mounting portion 55 may be raised from a portion of the mudguard 11 adjacent to the second edge of the mudguard 11 toward the rear of the vehicle 1. Additionally, the second lower mounting portion 55 may have a mounting hole 55*a* in which a fastener is received.

The second lower mounting portion 55 may be connected to the second upper mounting portion 54 through a second extension rib 58. The second extension rib 58 may be raised toward the rear of the vehicle 1. The second upper mounting portion 54, the second extension rib 58, and the second lower mounting portion 55 may be connected along a curved portion of the mudguard 11. Accordingly, the stiffness of the curved portion of the mudguard 11 may be improved.

As described above, the raised first upper mounting portion 52, the raised first extension rib 57, and the raised first lower mounting portion 53 may extend along the first edge of the mudguard 11. The raised second upper mounting portion 54, the raised second extension rib 58, and the raised second lower mounting portion 55 may extend along the second edge of the mudguard 11. As a result, the stiffness of the mudguard 11 may be improved.

Referring to FIG. 9, the mudguard 11 may be mounted on the first mounting member 26 and the second mounting member 27 of the mounting frame 25 of the mounting stay hanger 12 through fasteners 34 and 35.

The mounting hole 52*a* of the first upper mounting portion 52 may be aligned with the upper mounting hole 26*a* of the first mounting member 26. The fastener 34 consisting of a bolt and a nut may be provided in the mounting hole 52*a* of the first upper mounting portion 52 and the upper mounting hole 26*a* of the first mounting member 26 so that the first upper mounting portion 52 of the mudguard 11 may be fixed to the inclined portion of the first mounting member 26.

The mounting hole 53*a* of the first lower mounting portion 53 may be aligned with the lower mounting hole 26*b* of the first mounting member 26. The fastener 35 consisting of a bolt and a nut may be provided in the mounting hole 53*a* of the first lower mounting portion 53 and the lower mounting hole 26*b* of the first mounting member 26 so that the first lower mounting portion 53 of the mudguard 11 may be fixed to the vertical portion of the first mounting member 26.

The mounting hole 54*a* of the second upper mounting portion 54 may be aligned with the upper mounting hole 27*a* of the second mounting member 27. The fastener 34 consisting of a bolt and a nut may be provided in the mounting hole 54*a* of the second upper mounting portion 54 and the upper mounting hole 27*a* of the second mounting member 27 so that the second upper mounting portion 54 of the mudguard 11 may be fixed to the inclined portion of the second mounting member 27.

The mounting hole 55*a* of the second lower mounting portion 55 may be aligned with the lower mounting hole 27*b* of the second mounting member 27. The fastener 35 consisting of a bolt and a nut may be provided in the mounting hole 55*a* of the second lower mounting portion 55 and the lower mounting hole 27*b* of the second mounting member 27 so that the second lower mounting portion 55 of the mudguard 11 may be fixed to the vertical portion of the second mounting member 27.

Referring to FIG. 12, the mudguard 11 may have a flat surface 56 provided on a lower portion thereof. The flat surface 56 may be vertically flat. For example, a rear reflective safety strip may be attached to the flat surface 56.

Figure 7:
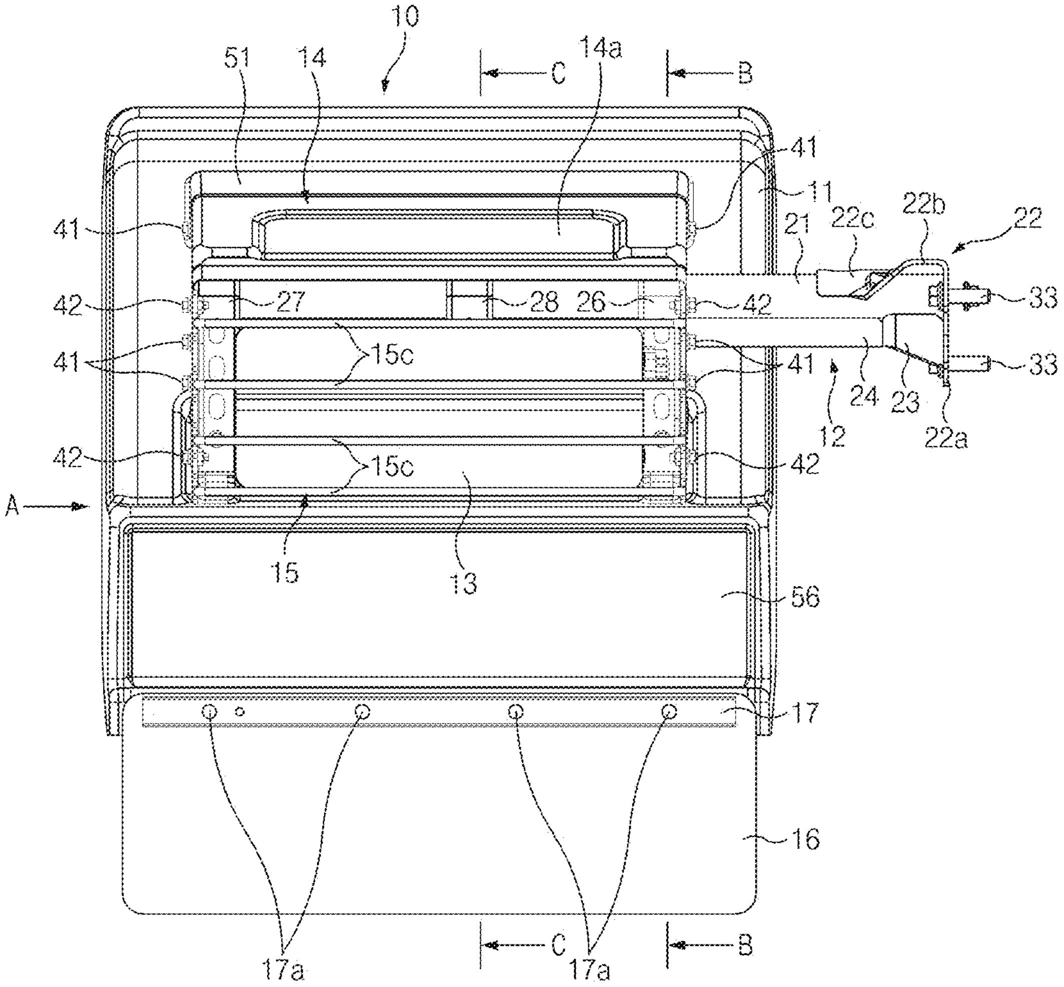
FIG. 7 illustrates a front view of a mudguard structure according to an embodiment of the present disclosure.
Figure 8:
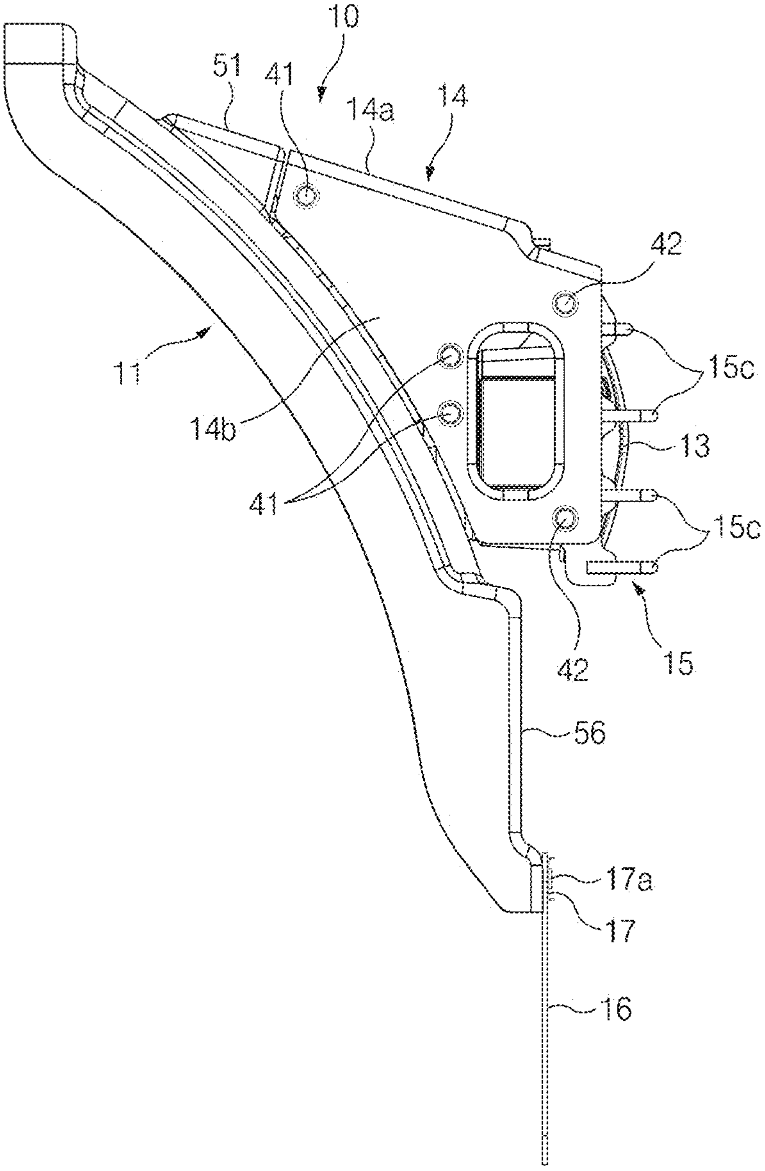
FIG. 8 illustrates a side view of the mudguard structure, which is viewed in a direction indicated by arrow A of FIG. 7.

Referring to FIGS. 7, 8, and 12, the mudguard 11 may further include a mudflap 16 fixed to a bottom end thereof through a retainer 17. The mudflap 16 may be vertically flat. The mudflap 16 may be located below the flat surface 56. The retainer 17 together with the mudflap 16 may be fixed to the bottom end of the mudguard 11 through fasteners 17*a*.

Figure 10:
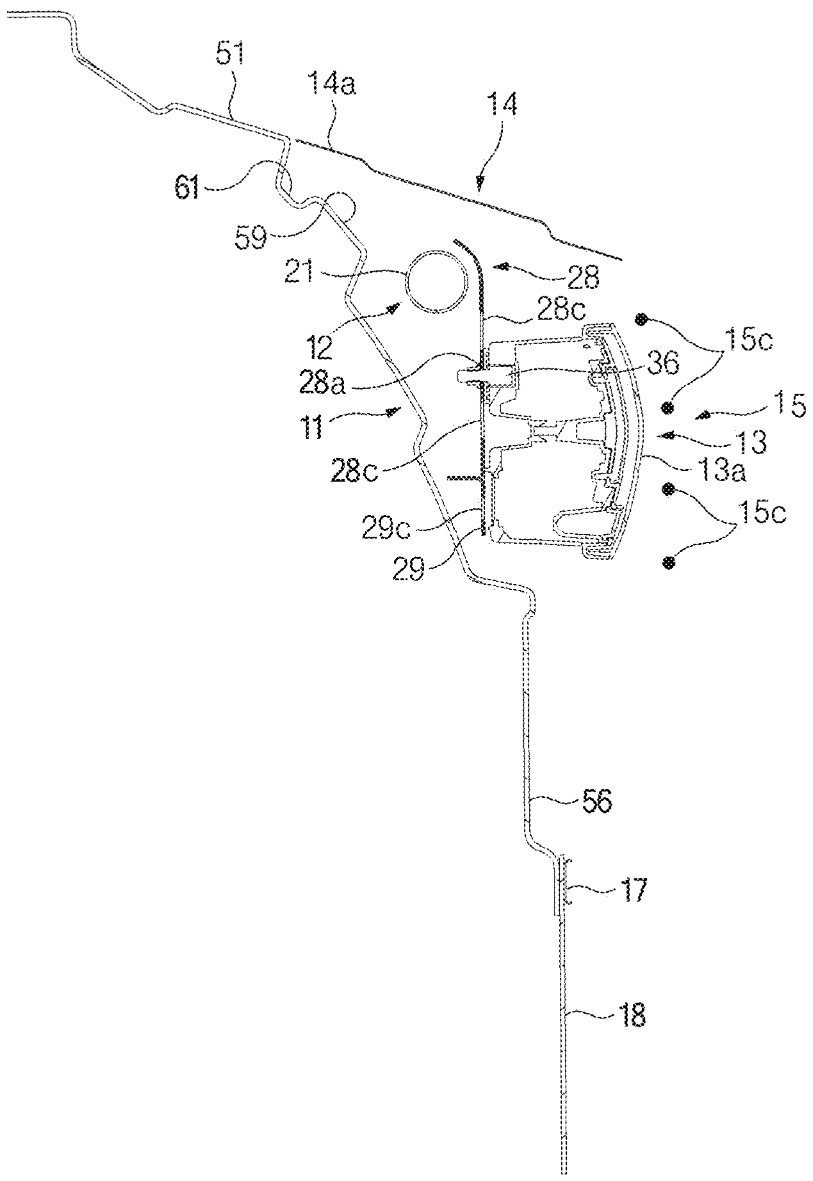
FIG. 10 illustrates a cross-sectional view of the mudguard structure, taken along line C-C of FIG. 7.
Figure 11:
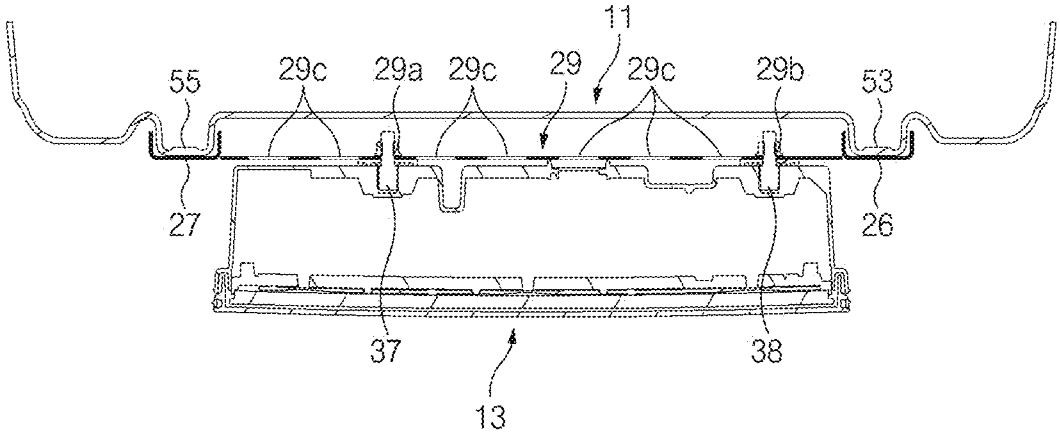
FIG. 11 illustrates a plan cross-sectional view of a state in which a lamp of a mudguard structure according to an embodiment of the present disclosure is mounted on a lower member of a mounting stay hanger.

The lamp 13 may be mounted on the rear end of the chassis frame 3 through the mounting stay hanger 12. The lamp 13 and the mudguard 11 may be fixed to the mounting frame 25 of the mounting stay hanger 12. Referring to FIGS. 10 and 11, the lamp 13 may be fixed to the third mounting member 28 and the lower member 29 of the mounting frame 25 of the mounting stay hanger 12. The lamp 13 may be mounted on the mounting frame 25 of the mounting stay hanger 12 in a manner that the lamp is adjacent the mudguard 11.

Referring to FIG. 10, an upper portion of the lamp 13 may be fixed to the mounting hole 28*a* of the third mounting member 28 of the mounting frame 25 through a fastener 36. Referring to FIG. 11, a lower portion of the lamp 13 may be fixed to the mounting holes 29*a* and 29*b* of the lower member 29 of the mounting frame 25 through a plurality of fasteners 37 and 38.

Referring to FIGS. 7 and 8, the mudguard structure 10 according to an embodiment of the present disclosure may further include a cover 14 configured to cover the upper portion and second and first side surfaces of the lamp 13. The cover 14 may prevent water and other foreign objects from entering the lamp 13. The cover 14 may be mounted on the mounting frame 25 of the mounting stay hanger 12.

Figure 13:
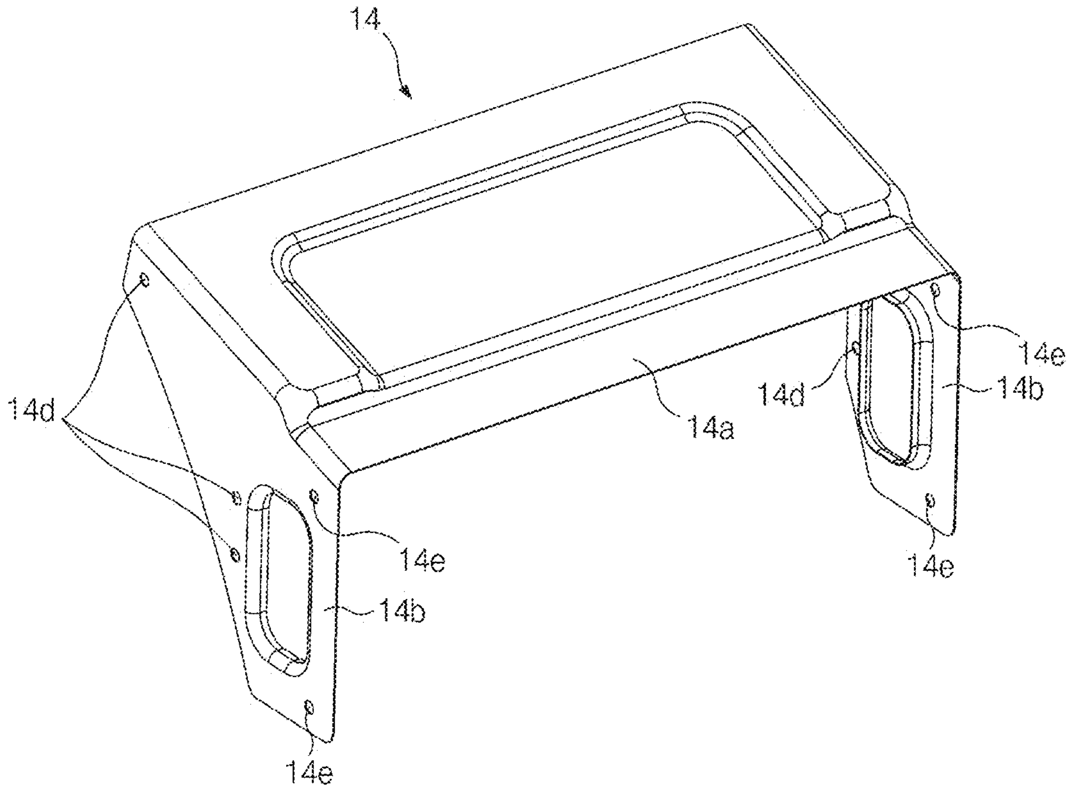
FIG. 13 illustrates a perspective view of a cover for each mudguard structure according to an embodiment of the present disclosure.

Referring to FIG. 13, the cover 14 may include a top wall 14*a* and a pair of sidewalls 14*b*. Each sidewall 14*b* is provided at a respective side edge of the top wall 14*a*.

The top wall 14*a* may be inclined at a predetermined angle. Accordingly, water may be discharged to the outside through the top wall 14*a*, and the water may be prevented from entering the lamp 13.

Each sidewall 14*b* may have a plurality of first mounting holes 14*d* and a plurality of second mounting holes 14*e*. The plurality of first mounting holes 14*d* may correspond to mounting holes (not shown) of the first mounting member 26 and mounting holes 27*d* of the second mounting member 27 of the mounting frame 25 of the mounting stay hanger 12, respectively. A plurality of fasteners 41 may be provided in the plurality of first mounting holes 14*d* so that the pair of sidewalls 14*b* may be fixed to the first mounting member 26 and the second mounting member 27 of the mounting frame 25 of the mounting stay hanger 12 through the plurality of fasteners 41. For example, the sidewall 14*b* that is adjacent to the chassis frame 3 may be fixed to the first mounting member 26 of the mounting frame 25 through the plurality of fasteners 41. The sidewall 14*b* that is far away from the chassis frame 3 may be fixed to the second mounting member 27 of the mounting frame 25 through the plurality of fasteners 41.

Referring to FIG. 12, the mudguard 11 may include an inclined portion 51 provided on an upper portion thereof. The inclined portion 51 may be raised from the upper portion of the mudguard 11, and the inclined portion 51 may extend along the width direction of the mudguard 11. Accordingly, the stiffness of the upper portion of the mudguard 11 may be improved by the inclined portion 51. The inclined portion 51 may be inclined at an angle that is the same as that of the top wall 14*a* of the cover 14. The inclined portion 51 may be aligned with the top wall 14*a* of the cover 14. Accordingly, water may be prevented from flowing into the lamp 13.

Referring to FIG. 12, the mudguard 11 may have a protruding portion 59 located below the inclined portion 51. The protruding portion 59 may extend along the width direction of the mudguard 11. A discharge channel 61 may be defined between the inclined portion 51 and the protruding portion 59. Both ends 61*a* of the discharge channel 61 may be open. Referring to FIG. 10, the protruding portion 59 and the discharge channel 61 may be located above the lamp 13. Accordingly, water flowing down through a gap between the inclined portion 51 and the top wall 14*a* of the cover 14 may be collected in the discharge channel 61. Once collected in the discharge channel 61, the water may be discharged to the outside through both open ends 61*a* of the discharge channel 61 so that the water may be prevented from entering the lamp 13.

Figure 14:
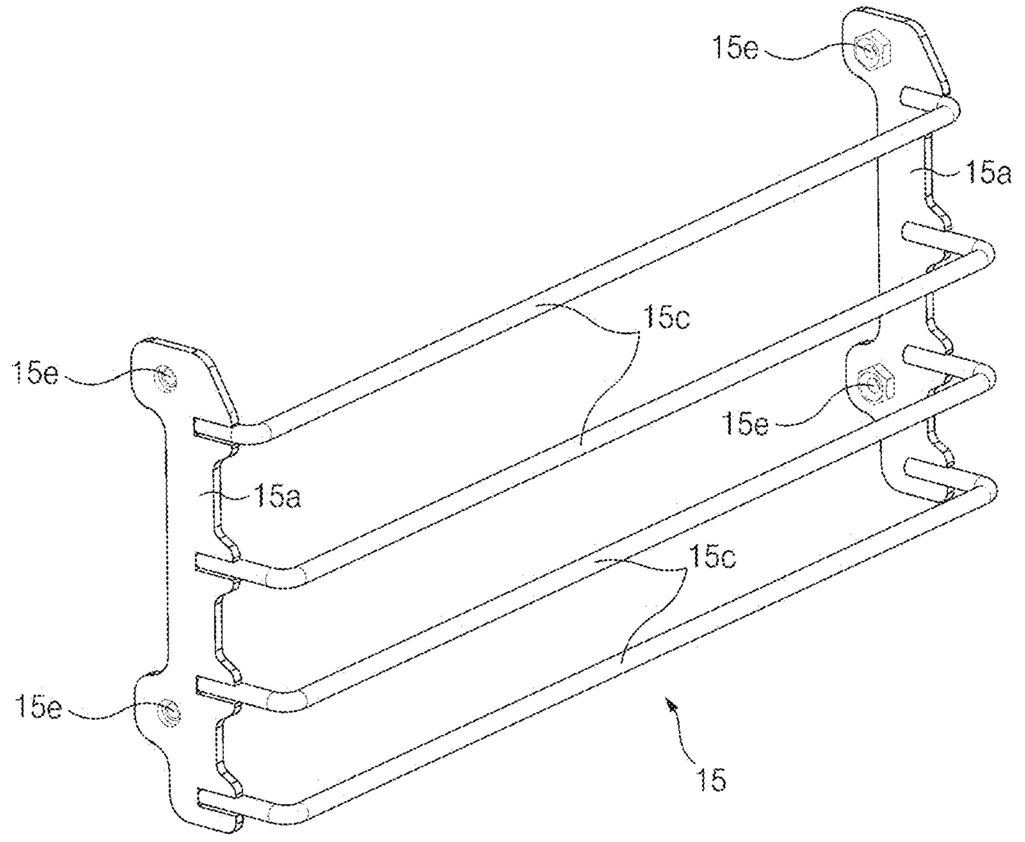
FIG. 14 illustrates a perspective view of a protector for each mudguard structure according to an embodiment of the present disclosure.

The mudguard structure 10 according to an embodiment of the present disclosure may further include a protector 15 protecting an irradiation surface 13*a* of the lamp 13. The irradiation surface 13*a* of the lamp 13 provides illumination toward a rear of the vehicle 1 in this case and thus faces away from the mudguard 11. The protector 15 may be mounted on the cover 14 through a plurality of fasteners 42. Referring to FIG. 14, the protector 15 may include a pair of sidewalls 15*a* and may include a plurality of horizontal bars 15*c* extending transverse to the pair of sidewalls 15*a*. The plurality of horizontal bars 15*c* may be spaced apart from each other in a vertical direction so that the plurality of horizontal bars 15*c* may partially cover the irradiation surface 13*a* of the lamp 13. Each sidewall 15*a* may have a plurality of mounting holes 15*e*. A welded nut may be aligned with each mounting hole 15*e*. The plurality of mounting holes 15*e* provided in each sidewall 15*a* of the protector 15 may be aligned with the plurality of second mounting holes 14*e* provided in each sidewall 14*b* of the cover 14. The fasteners 42 may be provided in the second mounting holes 14*e* of the cover 14 and the mounting holes 15*e* of the protector 15, respectively, so that each sidewall 15*a* of the protector 15 may be fixed to the corresponding sidewall 14*b* of the cover 14 through the plurality of fasteners 42.

As set forth above, the mudguard structure for a vehicle according to the embodiments of the present disclosure may be designed to mount the lamp and the mudguard together on the chassis frame of the vehicle through the mounting stay hanger. As a result, the mudguard structure may simplify the assembly of the lamp and the mudguard, reduce the weight of the vehicle, and prevent any damage occurring to the lamp caused by an impact force. The mudguard and the lamp may be mounted on the mounting frame of the mounting stay hanger in a manner that they face each other, and thus the ability to assemble the mudguard and the lamp may be improved.

According to the embodiments of the present disclosure, the second wall and the curved wall of the mounting bracket may be perpendicular to the first wall of the mounting bracket. Additionally, the hanger body may be firmly fixed to the first wall and the curved wall. Furthermore, the first wall may be firmly fixed to the sidewall of the chassis frame so that the mounting bracket may be firmly fixed to the sidewall of the chassis frame. As a result, all stresses acting on the mounting stay hanger may be uniformly distributed through the mounting bracket.

According to the embodiments of the present disclosure, the mounting bracket and the lower reinforcing member may face each other above and below the first end portion of the hanger body so that the second moment of area of the hanger body may be increased at the first end portion of the hanger body. As a result, the stiffness of the hanger body may be improved, and the sagging of the hanger body may be prevented. The lower reinforcing member may firmly support the bottom surface of the first end portion of the hanger body, and when the bending load acts on the mounting stay hanger, the lower reinforcing member may absorb the bending load. As a result, the connection stiffness between the mounting stay hanger and the chassis frame may be improved.

According to the embodiments of the present disclosure, the reinforcing plate may be fixed to the bottom surface of the hanger body between the mounting frame and the lower reinforcing member. This configuration improves the second moment of area of the hanger body, the stiffness of the hanger body, and prevents the hanger body from sagging.

According to the embodiments of the present disclosure, the first upper mounting portion, the first extension rib, and the first lower mounting portion may extend along the first edge of the mudguard. The second upper mounting portion, the second extension rib, and the second lower mounting portion may extend along the second edge of the mudguard. As a result, the stiffness of the mudguard may be improved.

Hereinabove, although the present disclosure has been described with reference to various embodiments and the accompanying drawings, the present disclosure is not limited thereto. Instead, the embodiments of the present disclosure may be variously modified and altered by those having ordinary skill in the art to which the present disclosure pertains without departing from the spirit and scope of the present disclosure claimed in the following claims.

What is claimed is:

1. A mudguard structure for a vehicle, the mudguard structure comprising:

a mounting stay hanger mounted on a chassis frame of the vehicle;

a mudguard mounted on the mounting stay hanger; and a lamp mounted on the mounting stay hanger adjacent to the mudguard, wherein the mounting stay hanger includes a hanger body cantilevered and extending from the chassis frame and includes a mounting frame fixed to the hanger body, and wherein the mounting frame includes a first mounting member fixed to a middle portion of the hanger body, a second mounting member fixed to a second end portion of the hanger body, a third mounting member located between the first mounting member and the second mounting member, and a lower member connecting a bottom end of the first mounting member, a bottom end of the second mounting member, and a bottom end of the third mounting member.

2. The mudguard structure according to claim 1, wherein:

a first end portion of the hanger body is fixed to the chassis frame through a mounting bracket;

the mounting bracket includes a first wall fixed to the chassis frame, a second wall connected perpendicular to the first wall, and a curved wall connected to the second wall;

the curved wall is curved to match a top surface of the first end portion of the hanger body; and the first end portion of the hanger body is fixed to the curved wall and the first wall.

3. The mudguard structure according to claim 1, wherein the mounting stay hanger further includes a lower reinforcing member supporting a bottom surface of a first end portion of the hanger body.

4. The mudguard structure according to claim 3, wherein the mounting stay hanger further includes a reinforcing plate fixed to the hanger body and the mounting frame.

5. The mudguard structure according to claim 4, wherein:

the reinforcing plate extends in a longitudinal axis of the hanger body;

a first end portion of the reinforcing plate is fixed to the lower reinforcing member; and a second end portion of the reinforcing plate is fixed to the mounting frame.

6. The mudguard structure according to claim 1, wherein the mudguard is fixed to the first mounting member and the second mounting member by a plurality of fasteners.

7. The mudguard structure according to claim 6, wherein the mudguard comprises:

a first upper mounting portion;

a first lower mounting portion connected to the first upper mounting portion through a first extension rib;

a second upper mounting portion spaced apart from the first upper mounting portion in a width direction of the mudguard; and a second lower mounting portion connected to the second upper mounting portion through a second extension rib, wherein the first upper mounting portion and the first lower mounting portion are fixed to the first mounting member through a plurality of fasteners, and wherein the second upper mounting portion and the second lower mounting portion are fixed to the second mounting member through a plurality of fasteners.

8. The mudguard structure according to claim 7, wherein the first upper mounting portion, the first extension rib, and the first lower mounting portion are raised from the mudguard, and wherein the second upper mounting portion, the second extension rib, and the second lower mounting portion are raised from the mudguard.

9. The mudguard structure according to claim 1, wherein the mudguard further includes a mudflap fixed to a bottom end thereof.

10. The mudguard structure according to claim 1, wherein the lamp is fixed to the third mounting member and the lower member through a plurality of fasteners.

11. The mudguard structure according to claim 1, further comprising a cover covering an upper portion and opposing side surfaces of the lamp, wherein the cover includes a top wall and a pair of sidewalls, and wherein each sidewall is provided at a respective side edge of the top wall.

12. The mudguard structure according to claim 11, wherein:

the mudguard further includes an inclined portion provided on an upper portion thereof;

the inclined portion is inclined at an angle that is the same as that of the top wall of the cover; and the inclined portion is aligned with the top wall of the cover.

13. The mudguard structure according to claim 12, further comprising a protector configured to protect an irradiation surface of the lamp, wherein the protector is mounted on the cover through a plurality of fasteners.

14. The mudguard structure according to claim 13, wherein:

the protector includes a pair of sidewalls and a plurality of horizontal bars extending transverse to the pair of sidewalls; and each sidewall of the protector is fixed to a corresponding sidewall of the cover through the plurality of fasteners.

15. The mudguard structure according to claim 1, wherein the mudguard further includes a discharge channel located above the lamp.

* * * * *